US010556586B2

(12) United States Patent
Härslätt (10) Patent No.: US 10,556,586 B2
(45) Date of Patent: Feb. 11, 2020

(54) VEHICLE ASSISTANCE SYSTEM

(71) Applicant: VOLVO TRUCK CORPORATION, Göteborg (SE)

(72) Inventor: Peter Härslätt, Torslanda (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 207 days.

(21) Appl. No.: 15/542,663

(22) PCT Filed: Mar. 3, 2015

(86) PCT No.: PCT/EP2015/054434
§ 371 (c)(1),
(2) Date: Jul. 11, 2017

(87) PCT Pub. No.: WO2016/138942
PCT Pub. Date: Sep. 9, 2016

(65) Prior Publication Data
US 2018/0001889 A1 Jan. 4, 2018

(51) Int. Cl.
| G06F 19/00 | (2018.01) |
| B60W 30/09 | (2012.01) |
| G06K 9/00 | (2006.01) |
| G08G 1/04 | (2006.01) |
| G08G 1/16 | (2006.01) |

(52) U.S. Cl.
CPC ......... B60W 30/09 (2013.01); G06K 9/00785 (2013.01); G08G 1/04 (2013.01); G08G 1/167 (2013.01); B60T 2201/022 (2013.01); B60W 2510/10 (2013.01); B60W 2550/10 (2013.01)

(58) Field of Classification Search
CPC ............ B60W 30/09; B60W 2510/10; B60W 2550/10; G06K 9/00785; G08G 1/04; G08G 1/167; B60T 2201/022
USPC ....................................................... 701/301
See application file for complete search history.

(56) References Cited

U.S. PATENT DOCUMENTS

| 7,215,254 B2 | 5/2007 | Tauchi |
| 7,502,048 B2 | 3/2009 | Okamoto et al. |
| 8,145,413 B2 | 3/2012 | Shida |
| 8,400,507 B2 | 3/2013 | Grigsby et al. |
| 8,531,521 B2 * | 9/2013 | Romanowich ... G08B 13/19671 348/135 |
| 9,983,013 B1 * | 5/2018 | Krunic ............... G01C 21/3407 |
| 2008/0055056 A1 | 3/2008 | Mase et al. |

(Continued)

FOREIGN PATENT DOCUMENTS

| CN | 1984323 A | 6/2007 |
| CN | 102616235 A | 8/2012 |

(Continued)

OTHER PUBLICATIONS

International Search Report (dated Dec. 2, 2015) for corresponding International App. PCT/EP2015/054434.

(Continued)

*Primary Examiner* — Ronnie M Mancho
(74) *Attorney, Agent, or Firm* — Venable LLP; Jeffri A. Kaminski (57) ABSTRACT

A vehicle assistance system for a vehicle is provided. A corresponding computer implemented method and computer program product are also provided.

15 Claims, 5 Drawing Sheets

(56) References Cited

U.S. PATENT DOCUMENTS

| | | | |
|---|---|---|---|
| 2011/0128136 A1* | 6/2011 | Katoh | G08G 1/164 340/435 |
| 2014/0005884 A1* | 1/2014 | Hampiholi | B60Q 5/00 701/36 |
| 2014/0341434 A1 | 11/2014 | Lin et al. | |
| 2015/0345981 A1* | 12/2015 | Goldman-Shenhar | G01C 21/3629 701/533 |
| 2016/0093207 A1* | 3/2016 | Di Censo | H04R 1/1091 340/944 |
| 2017/0010613 A1* | 1/2017 | Fukumoto | G08G 1/096827 |
| 2017/0267178 A1* | 9/2017 | Shiga | B60R 11/02 |

FOREIGN PATENT DOCUMENTS

| | | |
|---|---|---|
| CN | 104057944 A | 9/2014 |
| EP | 1647448 A2 | 4/2006 |
| EP | 2169648 A1 | 3/2010 |
| EP | 2200312 A1 | 6/2010 |
| JP | 2002054320 A | 2/2002 |

OTHER PUBLICATIONS

International Preliminary Report on Patentability (dated Apr. 18, 2017) for corresponding International App. PCT/EP2015/054434.
Chinese Office Action dated Aug. 1, 2019 in corresponding CN Application No. 201580076795.7, 11 pages.

* cited by examiner

VEHICLE ASSISTANCE SYSTEM

BACKGROUND AND SUMMARY

The invention relates to a vehicle assistance system. The invention also relates to a corresponding computer implemented method and computer program product.

Recent advances in assisting a driver operating a vehicle have successfully emerged into the market as they compensate shortcomings of human drivers, such as inevitable reaction times for emergency brakes or deficiencies for vehicle stabilization. Systems providing such a drive assistance may typically be installed with the vehicle and comprise a suitable sensor arrangement (e.g. including radar, lidar, cameras) for detecting the vehicle environment and determine possible collision objects. Such a system may additionally be connected to the break arrangement of the vehicle and thus be capable of completely preventing an imminent collision or at least minimizing the consequences of a collision by an autonomously initiated full brake application.

Typical implementations of the above discussed functionality may for example find its way into automatic cruise control systems (ACC system) or in relation to (full or semi) autonomous vehicles, where e.g. the ACC system allows adaptability in regards to a preceding second vehicle such that the vehicle-to-vehicle distance is kept long enough to minimize a collision. In some instances, the ACC system may also take into account a further (e.g. third) vehicle placing itself in between the own vehicle and the second vehicle, possibly making it necessary to (emergency) break the own vehicle.

Even though the above discussed implementations for driver assistance minimize the collision risk, they are generally based on obstacles being direct and readily visible when seen from a perspective of the vehicle or driver of the vehicle. Accordingly, it could be interesting to be able to acquire information collected by further sensor arrangements positioned in the surrounding of the own vehicle for allowing assessment of a possible upcoming traffic situation, i.e. where the information collected by the further sensor arrangements holds information not readily visible from the own vehicle.

According to an aspect of the invention, a vehicle assistance system for a first vehicle is provided, comprising communication circuitry provided for image communication, and a control unit connected to the communication circuitry, wherein the control unit is configured to identify, using the communication circuitry, at least one external camera located remotely away from and within a predefined perimeter surrounding the first vehicle, acquire, using the communication circuitry, an image feed produced by the at least one external camera, determine at least one present or upcoming vehicle scenario for the first vehicle based on vehicle information extracted from an internal source of the first vehicle, the vehicle scenario including information relating to a current location of the first vehicle, determine a safety requirement for the vehicle scenario, correlate the image feed produced by the at least one external camera and the safety requirement for the vehicle scenario, and operate the first vehicle based on the image feed if the correlation between the image feed and the safety requirement indicates a match.

In accordance to the invention, the communication circuitry is configured to automatically identify if any external cameras are located within the surrounding of the own vehicle (the first vehicle) and if any such cameras are available, acquire an image feed from the cameras. Based on the operation of the vehicle, a safety requirement is determined, where the safety requirement is correlated with the image feed from the external camera(s) to see if there is a match. In case there is a match, actions may be taken for the own vehicle based on the content of the image feed.

Accordingly, visual information not readily available when seen from the perspective of the own vehicle may be used for improving the operational safety for the vehicle. That is, the image feed acquired from the external camera(s) typically holds visual illustrations of situations/scenarios that currently may not be seen from the own vehicle, and this information may be used for giving an improved understanding of the surrounding, such that suitable decisions for upcoming traffic scenarios may be taken even before they are taking place.

The expression "operate the first vehicle based on the image feed" should be interpreted in the broadest sense. For example, in a possible implementation of the invention, the vehicle may be an autonomous vehicle (full or semi), where the control unit may be configured for extracting specific features from the acquired image feed. The extracted features could subsequently be used for controlling for example a speed, a lane selection, a gear selection, etc. for the own/first vehicle. In another possible implementation of the invention, the vehicle may be a user operated vehicle. In such an implementation the operation of the vehicle may take a somewhat different approach, such as for example by providing at least a portion of the image feed to a display comprised with the vehicle assistance system, for example arranged in a driver's compartment of the vehicle. Accordingly, in such an implementation the image feed may be seen as an "extended view" that may be useful for the driver when operating the vehicle.

In accordance to the invention, the internal source of the first vehicle to be used for determining at least one present or upcoming vehicle scenario should be understood to include any type of component or element comprised with the first vehicle that may give information in regards to the operation of the vehicle. For example, the internal source could in one embodiment be a sensor comprised with the first vehicle. Such a sensor could for example be a sensor for determining a steering angle of the vehicle, a speed sensor, an inclination sensor, an acceleration sensor, etc. The internal source could also, in combination and/or alternatively, be part of a user interface comprised with the vehicle, such as for example a gear leaver, a turn signal leaver, etc. The internal source could also, within the scope of the invention, be a so called "virtual sensor", where collaborative vehicle environmental data is used for creating an output, similar to what could be expected from a "normal" sensor. For example, a yaw rate of the vehicle could be determined using e.g. GPS parameters, generating an output corresponding to what could be expected from a yaw rate sensor.

Typically the different internal vehicle sources as mentioned above may be switched between a plurality of predetermined states (on/off, between different gears, etc.), where the different states may be used as an indication of a present and upcoming vehicle scenario. For example, in case the driver of the vehicle shifts to a reverse gear, this information may be used for determining that the vehicle scenario is a reversal of the vehicle. The information from the internal vehicle sources may be distributed within an internal network of the vehicle, such as for example a CAN bus comprised with the vehicle.

In an embodiment of the invention, the vehicle scenario is selected from a predetermined set of vehicle scenarios, and at least one safety requirement is predetermined for each vehicle scenario of the set of vehicle scenarios. As understood from the above, the expression "vehicle scenario" should be understood to mean any type of operation and/or context that the vehicle may be in, at present or e.g. the near future. In relation to the above example, the vehicle scenario may be determined to be "reversal of the vehicle" based on the operation of the gear leaver. The vehicle scenario will in turn have a related safety requirement, for example predefined as being "a backward view where an obstacle is detectable". Hence, in case the vehicle is to be reversed (vehicle scenario), then the vehicle assistance system tries to identify an external camera that provided an image feed that will provide assistance during operation of the vehicle such that a potential obstacle behind the vehicle may be identified (safety requirement).

In accordance to the invention, the external camera is to be located within a predefined perimeter surrounding the (first) vehicle, however not comprised with the (first) vehicle. The expression "predefined perimeter" should be interpreted broadly. It could be possible to for example define the "size" of the perimeter based on the vehicle scenario. Thus, in travelling forward at a "highway speed", the perimeter may be made large as compared to a scenario where the vehicle is reversing at an in comparison low speed (high maneuverability). The perimeter may not necessarily be completely surrounding the vehicle. For example when based on the vehicle scenario and when reversing, the perimeter may be defined to be solely backward of the vehicle. Similar scenarios of course exist when travelling in the forward direction.

Preferably, the correlation of the image feed produced by the at least one external camera and the safety requirement for the vehicle scenario is further based on a coverage area for the at least one external camera. The expression "coverage area" should be understood to include for example a view angle and a useful distance range for the camera, as well as a coverage area defined by e.g. a first, a second and a third coordinate.

The location of the vehicle is in accordance to the invention and related to the concept of "perimeter" for the external camera. The location of the first vehicle could for example be acquired from a receiver for a Global Navigation Satellite System (GNSS, e.g. GPS, etc.) comprised with first vehicle. The vehicle information may also be location based, e.g. comprising map data acquired from a storage device comprised with the vehicle. The map data may be permanently of intermediately stored in the vehicle. When stored in an intermediate fashion, the map data may be acquired "on the go" from a remote/cloud server.

In a preferred embodiment of the invention the first vehicle further comprises a vehicle camera connected to the control unit, and the control unit is further configured to combining an image stream produced by the camera of the first vehicle with the image stream produced by the at least one external camera, and display the combined image stream using the display screen. Accordingly, it may in accordance to the invention be possible to e.g. "stich" image data acquired from the vehicle camera with the image stream acquired from the (at least one) external camera. The combination of image data is typically based on the location of the external camera, the coverage area of the external camera, the (current) position of the vehicle camera, and a corresponding coverage area for the vehicle camera.

In a possible embodiment of the invention, the control unit is further configured to acquire external information relating to the surrounding of the vehicle, and determine the at least one present or upcoming vehicle scenario based on the external information. Such information may for example be acquired from "infrastructure components" in the surrounding of the vehicle, from the external camera, and/or from a second/further/other vehicle within the predefined perimeter of the first vehicle. Each of the mentioned "external components" will in such an implementation include communication capability and will be able to transmit "relevant" information to the first vehicle. Communication between the first and the second vehicle for providing instructions and/or warnings may be in any form, typically based on radio or optical communication (e.g. vehicle-to-vehicle communication). Similarly, communication between a fixed positioned external camera, an infrastructure component (e.g. transmitting weather information, information relating to traffic congestions, etc.), etc. may be provided in a similar manner, for example defined as infrastructure-to-vehicle communication.

According to another aspect of the present invention there is provided a camera arrangement configured for use with a vehicle assistance system, wherein the camera arrangement comprises an image sensor configured to capture an image stream, a communication module configured for image communication, and an image processing circuitry connected to the communication module and the image sensor, wherein the image processing circuitry is configured to receive a request from an external communication node for the image stream, the request comprises a location of the external communication node, comparing a location of the camera arrangement and the location of the external communication node, and transmit the image stream to the external communication node if the external communication node is within a predefined perimeter surrounding the camera arrangement.

The camera arrangement is typically configured for use with the vehicle assistance system as discussed above, providing similar advantages.

According to a further aspect of the present invention there is provided a computer implemented method for operating a vehicle assistance system for a first vehicle, the vehicle assistance system comprising communication circuitry provided for image communication, and a control unit connected to the communication circuitry, wherein the method comprises the steps of identifying at least one external camera located remotely away from and within a predefined perimeter surrounding the first vehicle, acquiring an image feed produced by at least one external camera, determining at least one present or upcoming vehicle scenario for the first vehicle based on vehicle information extracted from an internal source of the first vehicle, the vehicle scenario including information relating to a current location of the first vehicle, determining a safety requirement for the vehicle scenario, correlating the image feed produced by the at least one external camera and the safety requirement for the vehicle scenario, and operating the first vehicle based on the image feed if the correlation between the image feed and the safety requirement indicates a match.

According to a still further aspect of the present invention there is provided a computer program product comprising a computer readable medium having stored thereon computer program means for operating a vehicle assistance system for a first vehicle, the vehicle assistance system comprising communication circuitry provided for image communication, and a control unit connected to the communication circuitry, the computer program product comprising code for identifying at least one external camera located remotely away from and within a predefined perimeter surrounding the first vehicle, code for acquiring an image feed produced by at least one external camera, code for determining at least one present or upcoming vehicle scenario for the first vehicle based on vehicle information extracted from an internal source of the first vehicle, the vehicle scenario including information relating to a current location of the first vehicle, code for determining a safety requirement for the vehicle scenario, code for correlating the image feed produced by the at least one external camera and the safety requirement for the vehicle scenario, and code for operating the first vehicle based on the image feed if the correlation between the image feed and the safety requirement indicates a match.

The computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1A:
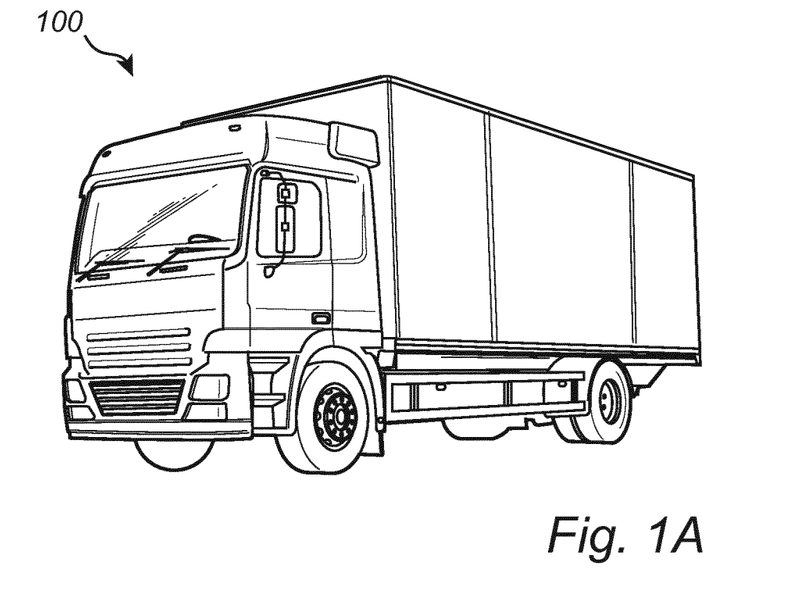
FIGS. 1A and 1B illustrate different types of vehicles equipped with a vehicle assistance system according to a currently preferred embodiment of the invention.
Figure 1B:
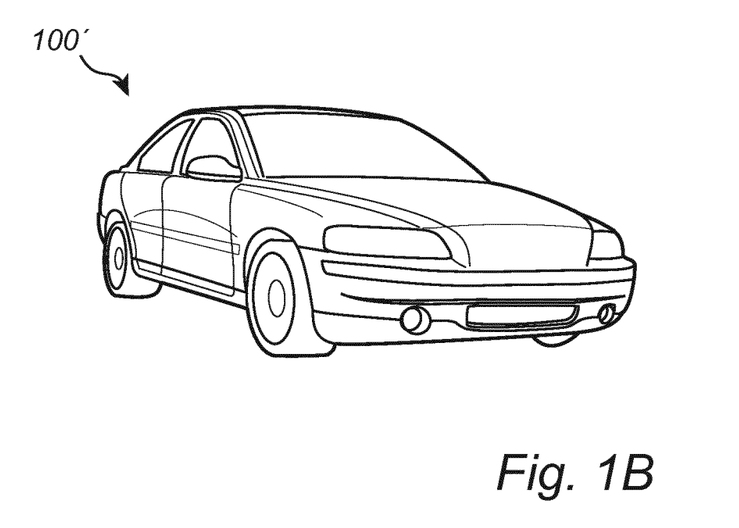

Referring now to the drawings and to FIGS. 1A, 1B, 2 and 3A in particular, there is in FIG. 1A depicted an exemplary vehicle, here illustrated as a truck 100, in which a system 300 according to the present invention may be incorporated. The system 300 may of course be implemented, possibly in a slightly different way, in a car 100', as shown in FIG. 1B.

Figure 2:
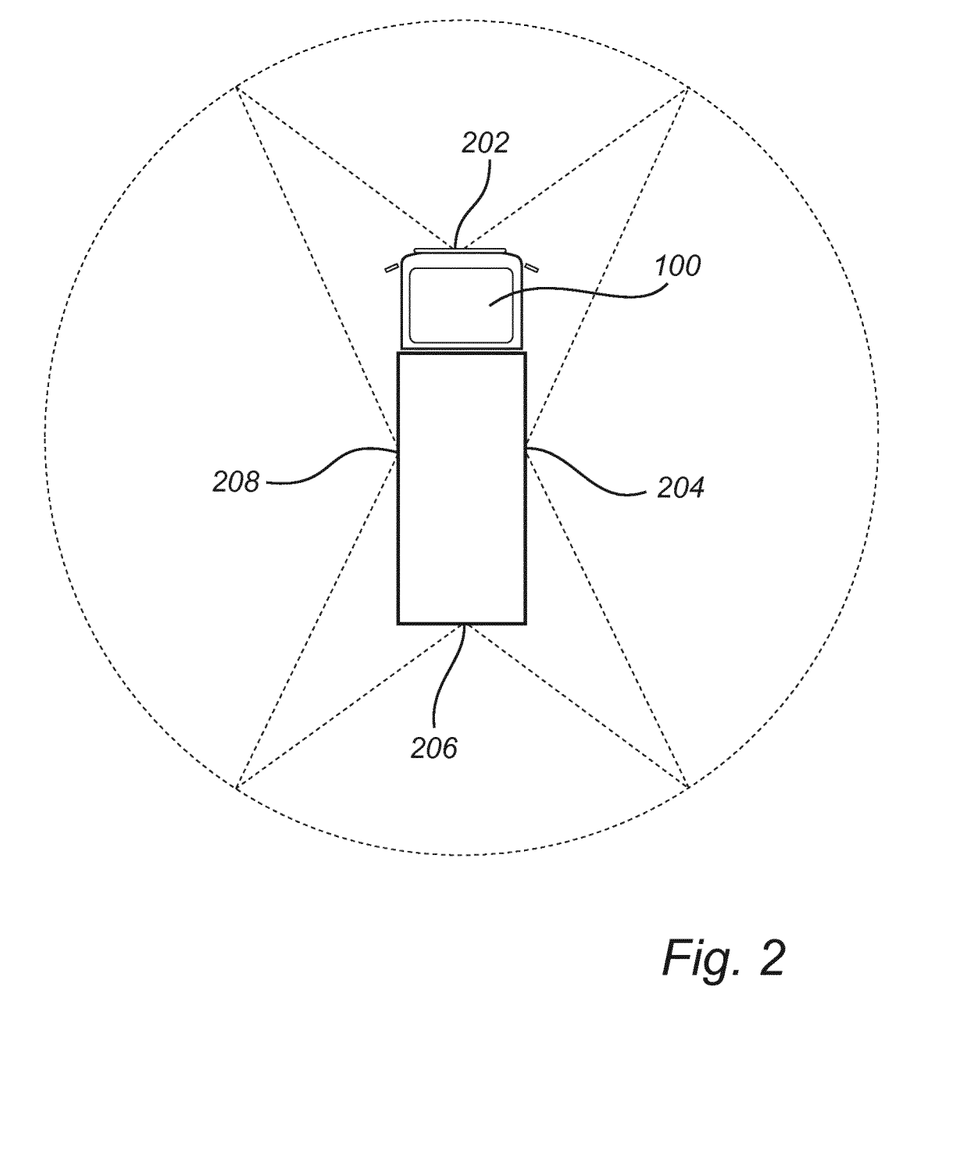
FIG. 2 shows an exemplary vehicle comprising a plurality of vehicle cameras for monitoring its surrounding.
Figure 3A:
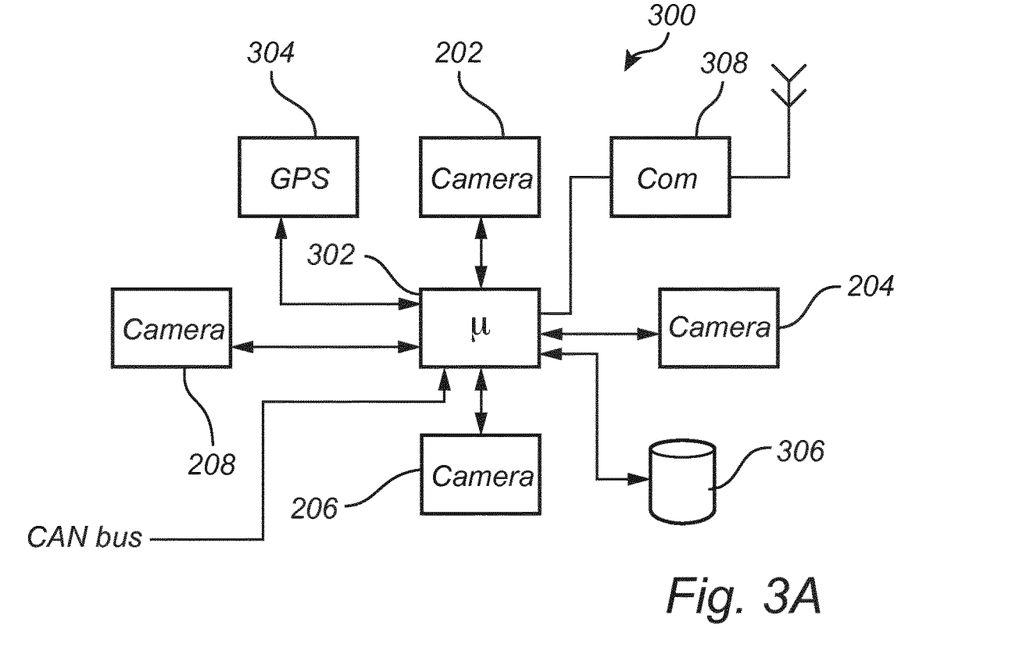
FIG. 3A provides an exemplification of the components of a vehicle assistance system.

The truck 100 is provided with a plurality of vehicle cameras 202, 204, 206 and 208, for monitoring the surrounding in all directions, preferably front, back, and the two sides of the truck 100. The vehicle cameras 202, 204, 206 and 208 are preferably connected to a control unit 302 for processing the signals provided by the vehicle cameras 202, 204, 206 and 208. The control unit 302 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The control unit 302 may also be connected to e.g. a communication interface (such as e.g. a CAN bus or similar, or a dedicated communication interface) of the truck 100, preferably for allowing control of elements of the truck, such as for example to control the steering and/or for controlling a break arrangement of the truck 100. Accordingly, from a determination made by the control unit 302 based on data provided by the vehicle cameras 202, 204, 206 and 208, it may be possible to control the operation of the truck 100, including for example allowing the direction (control the steering) and/or speed (control the break arrangement) of the truck 100 to be adjusted.

Further components may be connected to the control unit 302, including for example arrangements for determination of the position of the truck 100, such as for example a GPS 304 (global positioning system) combined with map information, e.g. stored in a local or remote database 306. The map data may comprise information relating to for example, type of road, and number of traffic lanes and/or any static obstacles on the road. In addition, the control unit 302 comprises communication circuitry 308 for allowing communication with "other" vehicles using vehicle-to-vehicle communication and/or for receiving data from surrounding objects/infrastructure components/external cameras within a predefined perimeter surrounding the truck 100.

Figure 3B:
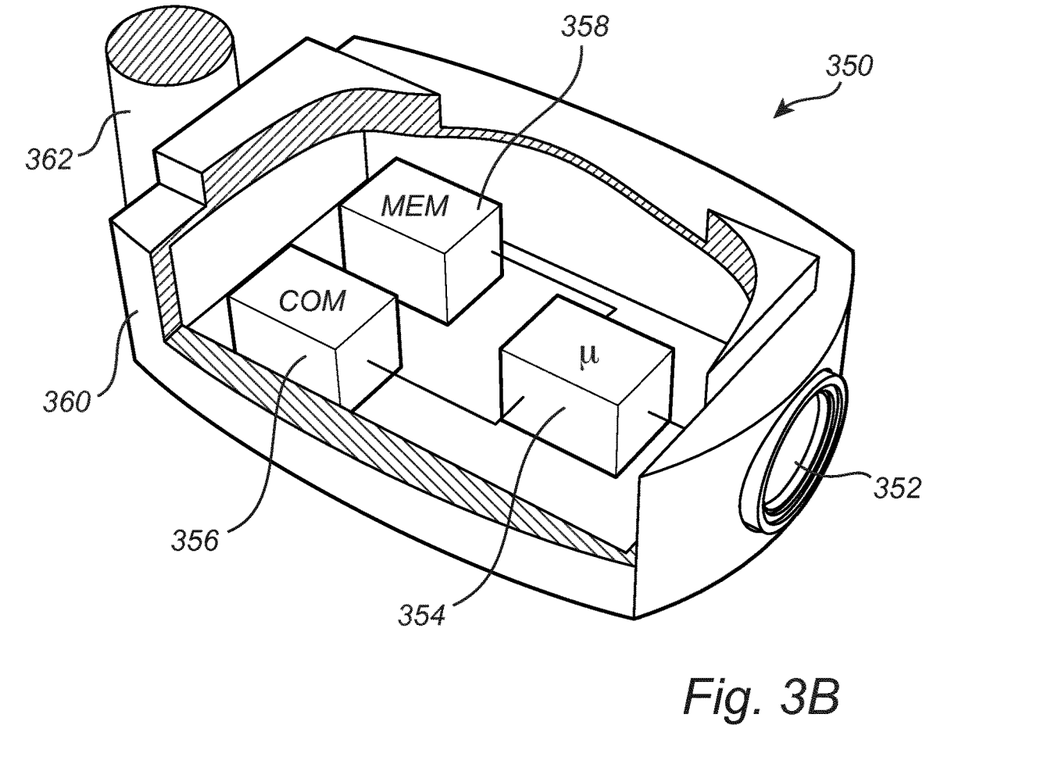
FIG. 3B shows an exemplified camera arrangement configured for use with such a vehicle assistance system.

Turning not to FIG. 3B, which illustrates a camera arrangement 350 configured for use with a vehicle assistance system, such as the vehicle assistance system 300 discussed above. The camera arrangement 350 comprises at least one image sensor 352 configured to capture an image stream and provided with associated optics, an image processing circuitry (or more generally a control unit as discussed above) 354 configured to control the operation of the camera arrangement 350, a communication module 356 configured to allow bidirectional communication with at least one external communication node, and a memory module 358 configured to e.g. intermediately store the image stream captured by the image sensor 352. The control unit 354 is in electrical communication with the image sensor 352, the communication module 356 and the memory module 358. The components of the camera arrangement 350 are arranged inside of an e.g. waterproof housing 360 allowing e.g. outdoor placement of the camera arrangement 350. In a possible embodiment of the invention, the camera arrangement 350 is placed in an elevated position at a light post 362, and positioned to overlooking a scene where e.g. a truck 100 as discussed above is operated.

As mentioned, the camera arrangement 350 is typically in collaboration with the vehicle assistance system 300 comprised with the truck 100, i.e. being the one external camera located remotely away from and within a predefined perimeter surrounding the truck 100.

Figure 4:
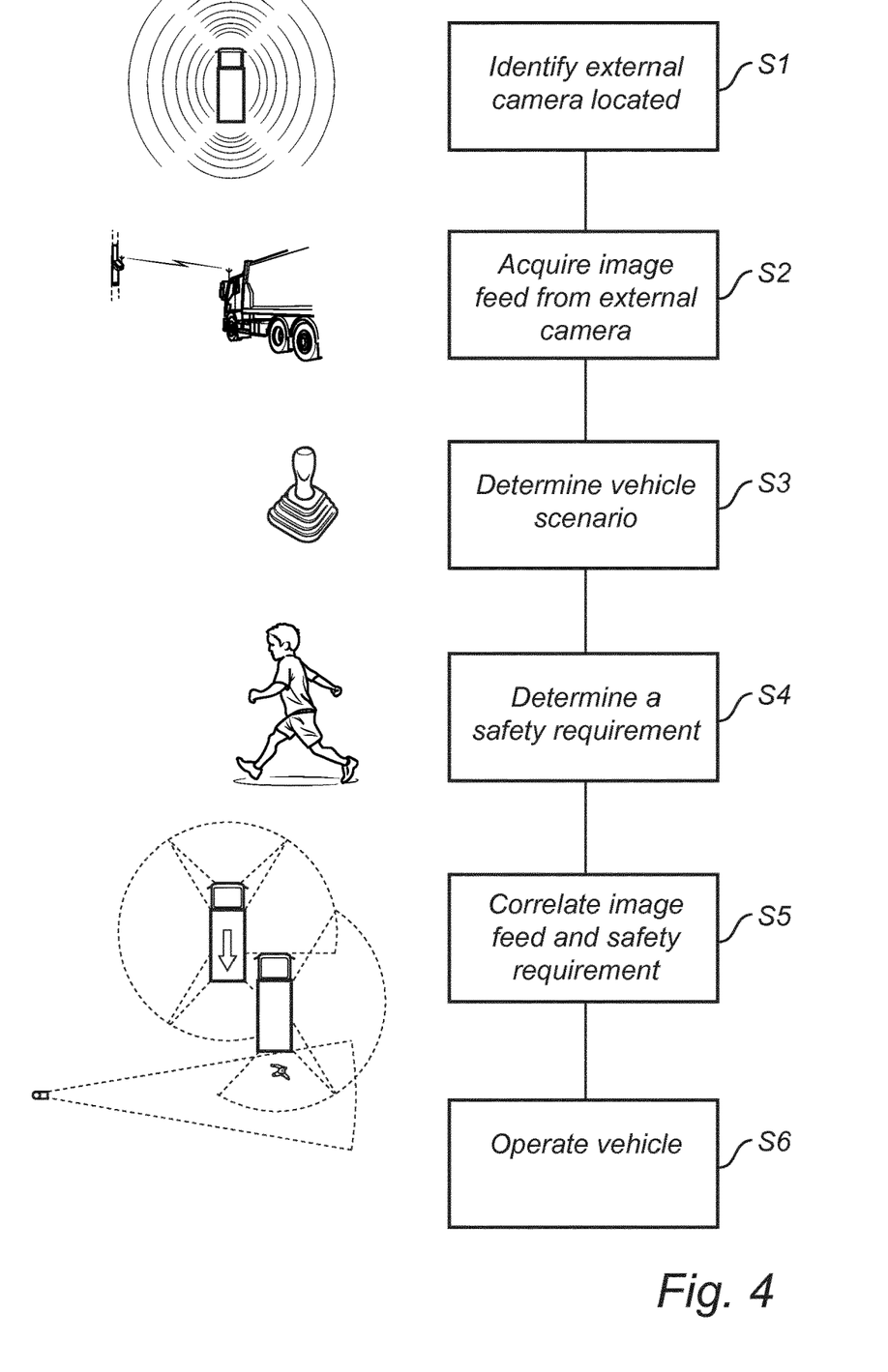
FIG. 4 conceptually illustrates, in conjunction with a first exemplary scene, the processing steps for performing the method according to the invention.

During operation of the vehicle assistance system 300 in e.g. conjunction with the camera arrangement 350, with further reference to FIG. 4, the process starts by that the communication circuitry 308 of the vehicle assistance system 300 and the communication module 356 of the camera arrangement 350 identifies, S1, each other. The identification may take place by either or both of the vehicle assistance system 300 and the camera arrangement 350 e.g. broadcasting their whereabouts and their desire to establish communication with each other. The communication between the vehicle assistance system 300 and the camera arrangement 350 may in one embodiment be a direct communication, e.g. defined as a vehicle-to-infrastructure (V2I) or infrastructure-to-vehicle (I2V) communication. The communication between the vehicle assistance system 300 and the camera arrangement 350 may alternatively, or also, be passing over e.g. the Internet.

In accordance to the invention, only when the vehicle assistance system 300 and the camera arrangement 350 are within a predefined perimeter surrounding the truck 100 a line of communication is created there between. Once a line of communication has been established, an image feed captured by the at least one image sensor 352 of the camera arrangement 350 is acquired, S2, by the vehicle assistance system 300. Within a related time frame (e.g. slightly before, after or in parallel with), at least one present or upcoming vehicle scenario for the first vehicle is determined, S3, based on vehicle information extracted from an internal source of the truck 100. The vehicle scenario typically includes information relating to a current location of the truck 100, for example acquired from the GPS 304.

As discussed above, the vehicle scenario is typically at least partly based upon information acquired from an internal source of information of the truck 100. For example, in case the driver of the vehicle shifts to a reverse gear, this information may be used for determining that the vehicle scenario is a reversal of the truck 100. The information from the internal vehicle sources may be distributed within an internal network of the truck 100, such as for example the CAN bus comprised with the truck 100.

The vehicle scenario will in turn serve as an input for determining, S4, a safety requirement for the truck 100. In case of reversing the truck 100, as indicated in FIG. 4, it will generally be desirable to have a clear back view without any disturbing obstacles, such as a person (such as the illustrated kid) moving within a predefined safety perimeter behind the truck 100.

In the scenario illustrated in FIG. 4, the truck 100 (the first truck) is to be operated in a reverse direction. However, a second truck is positioned in such a manner that the second truck at least partly obscures the backward view for the truck 100. In accordance to the invention, the vehicle assistance system 300 acquires an image feed from at least one external camera, in the illustration being either or both of a camera arrangement 300 positioned e.g. positioned on the light post 362, and/or a corresponding camera arrangement comprised with the second truck. The image feed acquired from the external camera(s) will in accordance to the invention be correlated, S5, with the earlier determined safety requirement, in the present example being an improved backward obstacle visibility.

In case of a user operate truck 100, the truck 100 will be further operated, S6, by presenting the image stream from the external camera(s) at a display unit comprised with the truck 100, where the display unit preferably is arranged in a driver compartment. In another embodiment, the truck 100 is a semi or fully autonomous vehicle, and the operation of the vehicle includes e.g. feature extraction from the image feed acquired from the external camera(s). The features extracted from the image feed may subsequently be used for controlling e.g. a breaking system of the vehicle.

In case of presenting the image stream at the display unit comprised with the vehicle, it may be desirable to combine, stich, etc. an image stream produced by one of the cameras 202, 204, 206, 208 comprised with the truck 100. It may in such an embodiment be desirable to take into account a relative position and direction of view for the external camera in regards to combining the image streams from the internal and external cameras.

Figure 5:
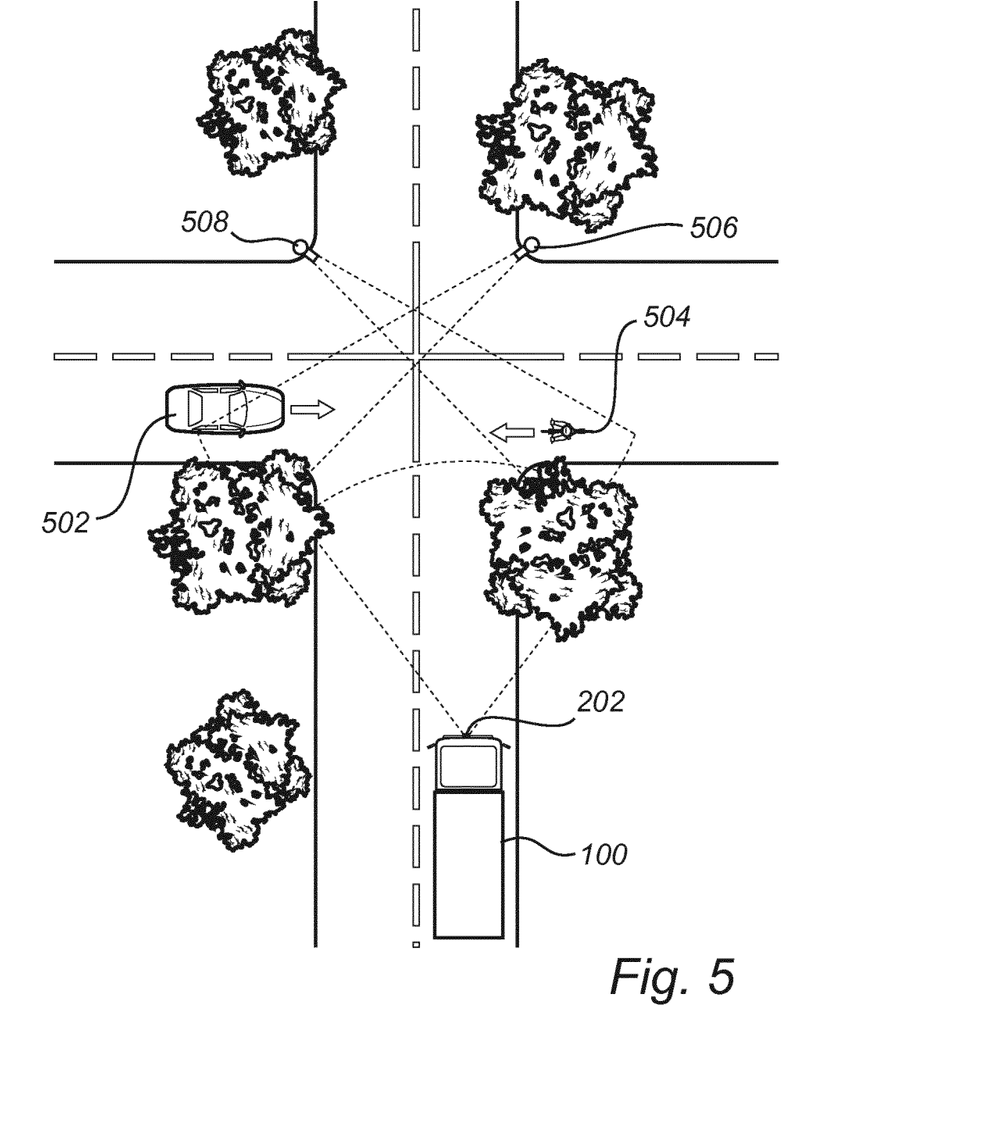
FIG. 5 illustrates a second exemplary scene comprising a vehicle equipped with the vehicle assistance system and a plurality of external cameras.

Turning finally to FIG. 5 which illustrates another scenario where the vehicle assistance system 300 comprised with the truck 100 may be of use for improving an operational safety for the truck 100. In the illustrated embodiment the truck 100 is moving towards a four way crossing (intersection), travelling on the right hand side of the road. The intersection does not provide a clear view for the driver of the truck 100, by means of a plurality of trees unfortunately positioned such that any vehicles and/or pedestrians, etc., coming from the crossing roads are readily visible to the driver of the truck 100. In the illustration of FIG. 5, a car 502 is coming from the left hand side and a bicycle 504 is coming from the right hand side, when seen from the perspective of the truck 100. In addition, the bicycle 504 is travelling on the "wrong side" of the street, which typically will not be expected by the driver of the truck 100.

By means of the invention, the vehicle assistance system 300 will identify a first 506 and a second 508 external camera arranged in an elevated positioned in the intersection. Further external cameras may of course be arranged in and around the intersection. In addition, the car 502 may be provided with a camera arrangement 350 as discussed above. The cameras 506 and 508 are overlooking the "hidden" parts of the intersection, when seen from the perspective of the truck 100.

The identification is as discussed above dependent on the predefined perimeter surrounding the truck 100. The perimeter may in the present scenario be a fixed distance, e.g. 100 meters surrounding the truck 100. The perimeter may also be dependent on the direction of travel for the truck 100 (such as only in front of the truck 100), a position of the truck 100 in relation to map data stored in the database 306. A correlation between the position of the truck 100 and the map data may result in a perimeter corresponding to a predefined "problematic area" when seen from a security perspective (e.g. based on previous knowledge of the obscuring trees).

Accordingly, once the cameras 506 and 508 have been identified, image streams may be acquired to the vehicle assistance system 300. Knowledge (e.g. based on the present location and the map data) of the upcoming intersection will in the present embodiment define the vehicle scenario, and predefined security requirements for such a vehicle scenario may be predefined as a clear view to the left and the right streets/roads as seen from the truck 100. By means of the invention, the image streams are correlated with the safety requirement, and in the present embodiment displayed to the driver of the truck 100 using the display unit arranged in the driver compartment. The driver of the truck 100 may thus in advance be informed of the bicycle 504 coming from the right hand side, thus making the driver of the truck 100 well prepared to take the appropriate action (such as breaking well in advance) before reaching the crossing/intersection. Thereby, the truck 100 may be operated with improved safety, even in situations where e.g. obstacles are not readily visible for the driver of the truck 100. In line with the above discussion, the driver of the truck 100 may possibly also be automatically informed (e.g. using haptic, audio), etc. of the car 502 and/or the bicycle 504, e.g. by means of feature extraction from the acquired image streams from the cameras 506, 508.

In summary, the present invention relates to a vehicle assistance system for a first vehicle, comprising communication circuitry provided for image communication, and a control unit connected to the communication circuitry, wherein the control unit is configured to identify, using the communication circuitry, at least one external camera located remotely away from and within a predefined perimeter surrounding the first vehicle, acquire, using the communication circuitry, an image feed produced by the at least one external camera, determine at least one present or upcoming vehicle scenario for the first vehicle based on vehicle information extracted from an internal source of the first vehicle, the vehicle scenario including information relating to a current location of the first vehicle, determine a safety requirement for the vehicle scenario, correlate the image feed produced by the at least one external camera and the safety requirement for the vehicle scenario, and operate the first vehicle based on the image feed if the correlation between the image feed and the safety requirement indicates a match.

The advantage with such a system is improved operational safety for the vehicle. Specifically, the image feed acquired from the external camera(s) typically holds visual illustrations of situations/scenarios that may not be seen from the own vehicle, and this information may be used for giving an improved understanding of the surrounding, such that suitable decisions for upcoming traffic scenarios may be taken even before they are taking place.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon.

Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed invention, from a study of the drawings, the disclosure, and the appended claims. The person skilled in the art realizes that the present invention is not limited to the preferred embodiments.

The invention claimed is:

1. A vehicle assistance system for a first vehicle, comprising:
   communication circuitry provided for image communication, and
   a control unit connected to the communication circuitry, wherein the control unit is configured to:
   determine at least one present or upcoming vehicle scenario for the first vehicle, based on vehicle information extracted from an internal source of the first vehicle, the at least one present or upcoming vehicle scenario being based on information in regards to the operation of the vehicle, wherein the vehicle scenario defines at least one of a present or upcoming operation and context for the first vehicle;
   select a safety requirement based on the vehicle scenario, wherein the safety requirement defines a perimeter for a present or upcoming safe operation of the first vehicle;
   automatically identify, using the communication circuitry, at least one external camera located remotely away from and within a predefined perimeter surrounding the first vehicle, the predefined perimeter determined is based on the at least one present or upcoming vehicle scenario for the first vehicle;
   acquire, using the communication circuitry, an image feed produced by the at least one external camera;
   matching, using the control unit, visual illustrations of a surrounding of the first vehicle comprised with the image feed produced by the at least one external camera and the safety requirement for the vehicle scenario, and operating, using the control unit, the first vehicle, based on a result of the matching between the image feed and the safety requirement, wherein the operating of the first vehicle, includes at least one of automatically controlling a speed, a lane selection and a gear selection of the first vehicle.

2. The vehicle assistance system according to claim 1, wherein the operating of the first vehicle, is based on features extracted from the acquired image feed.

3. The vehicle assistance system according to claim 1, wherein the vehicle scenario including information relating to a current location of the first vehicle.

4. The vehicle assistance system according to claim 1, wherein the vehicle scenario is selected from a predetermined set of vehicle scenarios, and at least one safety requirement is predetermined for each vehicle scenario of the set of vehicle scenarios.

5. The vehicle assistance system according to claim 1, wherein the vehicle information extracted from the internal source of the first vehicle, is generated by at least one controllable vehicle component comprised with the first vehicle.

6. The vehicle assistance system according to claim 1, further comprising a display screen connected to the control unit, wherein the control unit when operating the first vehicle, based on the image feed displays the image feed to a driver of the vehicle viewing the display screen.

7. The vehicle assistance system according to claim 1, wherein the vehicle information extracted from an internal network of the first vehicle, comprises road map data.

8. The vehicle assistance system according to claim 1, wherein the control unit receives a location of the first vehicle, from a GNSS receiver comprised with first vehicle.

9. The vehicle assistance system according to claim 1, wherein the vehicle information extracted from the internal source of the first vehicle, comprises information relating to a current user operation of the first vehicle.

10. The vehicle assistance system according to claim 6, wherein the first vehicle, further comprises a vehicle camera connected to the control unit, and the control unit is further configured to:
    combining an image stream produced by the camera of the first vehicle, with the image stream produced by the at least one external camera, and
    display the combined image stream using the display screen.

11. The vehicle assistance system according to claim 1, wherein the control unit is further configured to:
    acquire external information relating to the surrounding of the first vehicle, and
    determine the at least one present or upcoming vehicle scenario based on the external information.

12. The vehicle assistance system according to claim 11, wherein the external information is acquired from the external camera, a second vehicle within the predefined perimeter of the first vehicle, and a roadway infrastructure component within the predefined perimeter of the first vehicle.

13. The vehicle assistance system according to claim 12, wherein the predetermined perimeter is solely backward of the first vehicle, and the vehicle scenario is determined if a gear of the vehicle is put in reverse.

14. A computer implemented method for operating a vehicle assistance system for a first vehicle, the vehicle assistance system comprising communication circuitry provided for image communication, and a control unit connected to the communication circuitry, wherein the method comprises the steps of:

automatically identifying at least one external camera located remotely away from and within a predefined perimeter surrounding the first vehicle, the predefined perimeter determined is based on the at least one present or upcoming vehicle scenario for the first vehicle;

acquiring an image feed produced by at least one external camera;

determining at least one present or upcoming vehicle scenario for the first vehicle, based on vehicle information extracted from an internal source of the first vehicle, the vehicle scenario including information relating to a current location of the first vehicle, the at least one present or upcoming vehicle scenario being based on information in regards to the operation of the vehicle, wherein the vehicle scenario defines at least one of a present or upcoming operation and context for the vehicle;

selecting a safety requirement for the vehicle scenario, wherein the safety requirement defines a perimeter for a present or upcoming safe operation of the vehicle;

matching visual illustrations of a surrounding of the vehicle comprised with the image feed produced by the at least one external camera and the safety requirement for the vehicle scenario, and operating the first vehicle, based on the image feed if the correlation between the image feed and the safety requirement indicates a match, wherein the operating of the first vehicle includes at least one of automatically controlling a speed, a lane selection and a gear selection of the first vehicle.

15. A computer program product comprising a computer readable medium having stored thereon computer program means for operating a vehicle assistance system for a first vehicle, the vehicle assistance system comprising communication circuitry provided for image communication, and a control unit connected to the communication circuitry, the computer program product comprising:

code for automatically identifying at least one external camera located remotely away from and within a predefined perimeter surrounding the first vehicle, the predefined perimeter determined is based on the at least one present or upcoming vehicle scenario for the first vehicle;

code for acquiring an image feed produced by at least one external camera;

code for determining at least one present or upcoming vehicle scenario for the first vehicle, based on vehicle information extracted from an internal source of the first vehicle, the vehicle scenario including information relating to a current location of the first vehicle, the at least one present or upcoming vehicle scenario being based on information in regards to the operation of the vehicle, wherein the vehicle scenario defines at least one of a present or upcoming operation and context for the vehicle;

code for selecting a safety requirement for the vehicle scenario, wherein the safety requirement defines a perimeter for a present or upcoming safe operation of the vehicle;

code for matching, using the control unit, visual illustrations of a surrounding of the vehicle comprised with the image feed produced by the at least one external camera and the safety requirement for the vehicle scenario, and code for operating the first vehicle, based on the image feed if the correlation between the image feed and the safety requirement indicates a match,
wherein the operating of the first vehicle includes at least one of automatically controlling a speed, a lane selection and a gear selection of the first vehicle.

* * * * *